United States Patent [19]

Morgan et al.

[11] 4,364,595
[45] Dec. 21, 1982

[54] VEHICLE WINDOW ASSEMBLY

[75] Inventors: Cleon Morgan; John F. Thomas, Jr.; Raymond A. Meyer, all of Holland, Mich.

[73] Assignee: Donnelly Mirrors, Inc., Holland, Mich.

[21] Appl. No.: 194,432

[22] Filed: Oct. 6, 1980

[51] Int. Cl.³ ............................................. B60J 1/02
[52] U.S. Cl. .................................. 296/84 R; 52/208; 411/82; 296/146
[58] Field of Search .................. 296/84 R, 84 D, 146; 411/82, 81, 171, 166; 52/208, 474

[56] References Cited

U.S. PATENT DOCUMENTS

| | | | |
|---|---|---|---|
| 3,155,204 | 11/1964 | Campbell et al. | 189/77 |
| 3,274,740 | 9/1966 | Hall | 52/208 |
| 3,759,004 | 9/1973 | Kent | 52/400 |
| 3,774,363 | 11/1973 | Kent | 52/400 |
| 3,967,424 | 7/1976 | Gates | 52/208 |
| 4,072,340 | 2/1978 | Morgan | 296/84 R |
| 4,093,304 | 6/1978 | Ziegler | 296/84 D |
| 4,139,234 | 2/1979 | Morgan | 296/84 R |

Primary Examiner—Robert R. Song
Attorney, Agent, or Firm—Price, Heneveld, Huizenga & Cooper

[57] ABSTRACT

A lightweight, economical window assembly for vehicles which is assembled to a vehicle as a unit preferably from the exterior, while providing strength, decorative trim, as well as a sealing function. The assembly includes a window pane, one of several types of decorative frame or trim members surrounding the pane, and one or more attaching members secured directly to the pane but concealed from view from the exterior of the assembly. Preferably the pane is glass and the attaching members are metallic studs rigidly and securely bonded directly to the glass surface with a suitable adhesive system such as that marketed under the Tenabond trademark.

35 Claims, 15 Drawing Figures

VEHICLE WINDOW ASSEMBLY

BACKGROUND OF THE INVENTION

This invention relates to window assemblies for vehicles and, more particularly, to a lightweight, economical vehicle window assembly which is installed as a unit on a vehicle with any fasteners being concealed from view from the exterior, while providing decorative trim and sealing functions as part of the unit.

It has been common in vehicle manufacturing procedures to use a piecemeal assembly operation to install a window. Thus, a bead of sealant or the like is applied around the frame of a window, a pane of glass is pressed against the sealant and several clips or fasteners are secured around the glass edge to the surrounding frame to hold the glass in place. Thereafter, decorative covers or frames are placed around the frame or glass edge to dress the edge and cover the fastening area. As will be appreciated, such assembly procedures are time-consuming and expensive. They may also be prone to sealing problems should the bead of sealant not be applied properly or the fasteners be loose or otherwise improperly installed.

More recently, unitary window assemblies have been devised for installation directly from the exterior of a vehicle. Such assemblies, like that shown in U.S. Pat. No. 4,072,340, have included a pane of glass, an adjacent frame, and a casing or gasket of molded material, such as polyvinyl chloride, extending between the frame and the peripheral edge of the window which holds the pane and frame together. Fasteners are provided at spaced locations along the frame such that the entire assembly can be guided into location over an opening in a vehicle body as a unit with the fasteners extending through apertures provided in the body and secured in a single operation from the interior of the vehicle body.

Alternatively, window assemblies, such as that shown in U.S. Pat. No. 4,139,234, have included a molded casing or gasket around the edge of a pane of glass with fasteners molded in and projecting from the casing or gasket for attachment purposes.

Such prior unitary window assemblies have recently come under close scrutiny because of increased concern over weight reduction and fuel efficiency in automobiles and other vehicles. The relatively heavy frame, typically cast from zinc or other metal and/or the molded gasket or casing for securing the frame to the window provide significant weight in each window assembly. In addition, as in the structure of U.S. Pat. No. 4,072,340, the decorative frame, which requires the inclusion of fastening means therealong to secure the entire assembly in a vehicle, requires expensive casing techniques making the frame members relatively expensive.

With the focus on weight reduction and economics in designing new vehicles, it was desired that window assemblies be lighter in weight and less expensive, yet retain rigidity, strength and structural integrity. The present invention was conceived as a solution for the above problems while maintaining the strength, decorative trim function, sealing function and desirable fastening characteristics of previously known unitary or modular window assemblies.

SUMMARY OF THE INVENTION

Accordingly, the present invention is a lightweight, economical window assembly especially adapted for use in vehicles and designed to be assembled as a unit, preferably from the vehicle exterior, which provides concealed fastening of the assembly which is undetectable from the vehicle exterior, while also providing all necessary decorative trim and sealing functions in a one-step assembly procedure.

In one aspect, the invention provides a window assembly including a window pane, a decorative frame enclosing the peripheral edge surface of the window pane, and attaching means secured directly to at least one surface of the window pane for fastening the window assembly to an adjacent support. The decorative frame includes a flange extending a predetermined distance over the front surface of the window pane to cover an area adjacent the peripheral edge surface as well as securing means for securing the frame to the pane. The attaching means are concealed from view when the assembly is viewed from the direction of the front surface.

In other aspects of the invention, the attaching means are secured directly to the window pane with bonding means which provide a mechanical bond between the attaching means and window. When the attaching means are formed from metal and the window pane is glass, the bonding element is preferably an adhesive sufficient to adhere to metal to glass such as an adhesive containing anerobic polyacrylate cement, vinyl acetate/phenol formaldehyde, or epoxy cement.

One preferred adhesive system found desirable in this invention is the system sold under the trademark Tenabond. The Tendabond system includes a heat activatable epoxy cement and means for induction heating the attaching means and adhesive in a localized area which does not affect the glass while providing a strong, rigid and secure bond between metal and glass.

Many different types of decorative frames or trim members can be used including those made from molded plastic, metal, or a combination of metal and plastic. Such members may be molded in place around the peripheral edge of the glass or window pane, or snapped or bent into position. Moreover, the attaching means may extend around the edge of the glass to the front surface of the glass for greater security.

In yet another aspect of the invention, a sealant such as a butyl sealer can be applied in bead form to a surface of the glass so that, when installed, the assembly is properly sealed over the opening in the vehicle.

The present assembly accordingly provides a neatly appearing, finished window assembly which is easily installed as a unit from the exterior of a vehicle and fastened in one step from the vehicle interior. It is safely and securely retained to the vehicle by the direct, rigid bond between the preferred metallic attaching member and the glass pane using commercially available adhesives or bonding agents such as provided in the Tenabond (trademark) system. The assembly cannot be removed from the exterior after assembly without disconnecting the fasteners and is, therefore, tamper-proof, is light in weight because of the minimal decorative frame or trim necessary to cover the peripheral edge of the glass, and is economical to manufacture and install. The fasteners are concealed and undetectable when the unit is viewed from the exterior of the vehicle.

These and other objects, advantages, purposes and features of the invention will become more apparent from a study of the following description taken in conjunction with the drawings.

DESCRIPTION OF THE PREFERRED EMBODIMENTS

Figures 1, 2, 3:
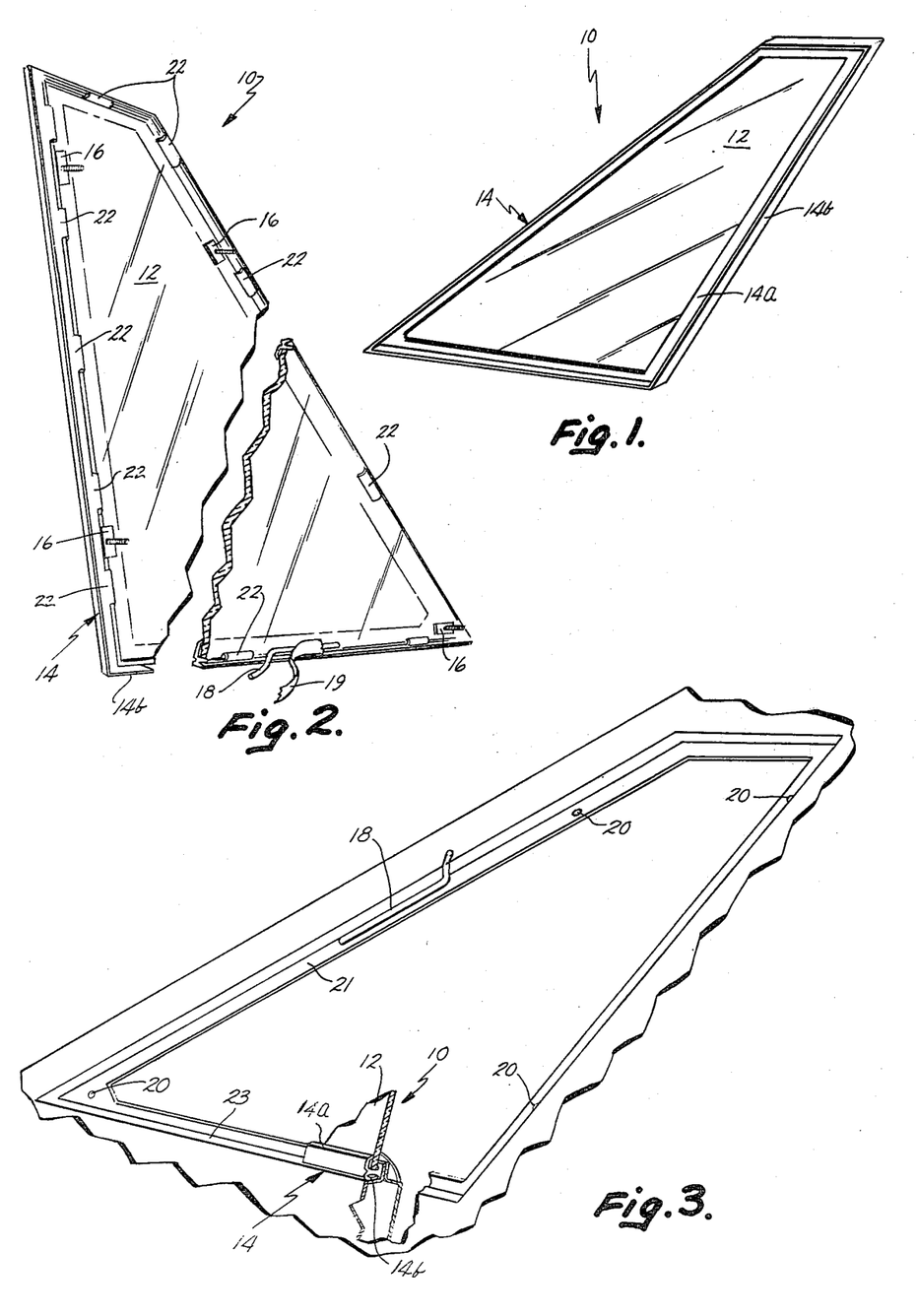
FIG. 1 is a front perspective view of one embodiment of the vehicle window assembly of the present invention.
FIG. 2 is a broken perspective view of the interior of the window assembly shown in FIG. 1.
FIG. 3 is a perspective view of a typical vehicle body window opening over which the window assembly shown in FIGS. 1 and 2 is designed to be fitted and illustrating a fragmentary portion of the window assembly fitted therein.

Referring now to the drawings in greater detail, a first embodiment 10 of the window assembly of the present invention is shown in FIGS. 1 and 2 and includes three primary components, namely, a window pane 12 which is cut to shape, bent or formed to the vehicle body contour as desired, and thereafter tempered, a surrounding or enclosing decorative frame member or bezel 14, and at least one attaching member or fastener 16 secured directly to the window pane 12. As will be more fully explained below, attaching studs or fasteners 16 are preferably mechanically bonded directly to a surface of the glass, such as the rear surface as shown in FIG. 2, with an appropriate adhesive bonding composition which rigidly and securely attaches the metallic stud or fastener to the glass surface. As shown in FIGS. 2 and 3, a bead of butyl sealant 18 may be applied around the edge of the window pane 12 and covered with wax paper covering strip 19 to protect and prevent the sealant from becoming dirty or contaminated during shipment of the window assembly to a vehicle manufacturing location. Alternately, the butyl sealant bead 18 may be applied around the pinch flange of the window opening in the vehicle body to which the assembly is adapted to be installed as shown in FIG. 3.

As will be appreciated, the present window assembly is preferably designed for fixing stationary windows in vehicle body openings directly from the exterior such that only a simple fastening of one or more nuts or fasteners over the attaching studs from the interior is necessary. A typical window opening, over which a correspondingly shaped assembly such as that shown in FIGS. 1 and 2 is fastened in an automobile or other vehicle, is shown in FIG. 3. Spaced apertures 20 are provided at locations along the pinch-weld flange of the sheet metal body work of the vehicle and are aligned with the attaching studs 16 such that the studs will project therethrough when the assembly is fitted over the opening.

As shown in FIG. 2, decorative trim frame 14 is assembled to the window pane 12 by a series of spaced, arcuate or rolled retaining tabs or flanges 22 which engage the rear surface of the window pane and hold the front flange 14a of the frame to the front surface of the window pane. Flanges 22 are heated and roll formed into position with suitable forming apparatus. In addition to front flange 14a retaining the window pane 12, the trim, which in this case is formed from a resinous plastic material, includes an outwardly extending flange 14b which extends under the assembly and presses outwardly against shoulder 23 of the vehicle body window aperture as is best seen in FIG. 3. Flange 14b, together with the butyl sealant 18, effectively seals out dust, water and other foreign matter from the interior of the vehicle body when the assembly 10 is fastened in place.

Figure 4:
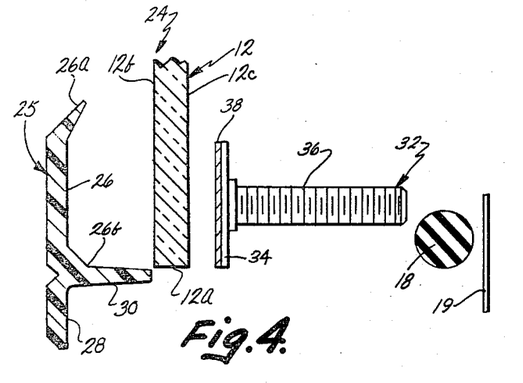
FIG. 4 is sectional, exploded side elevation of a second embodiment of the window assembly of the present invention.
Figure 5:
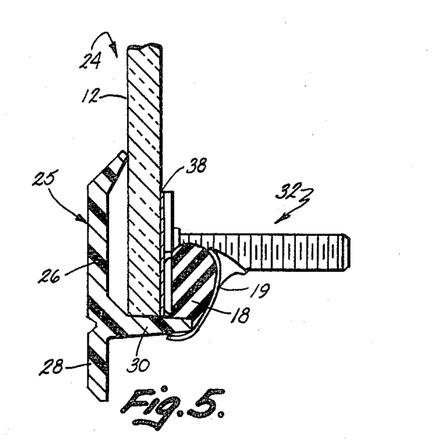
FIG. 5 is a sectional side elevation of the window assembly of FIG. 4 shown in its assembled condition.
Figure 6:
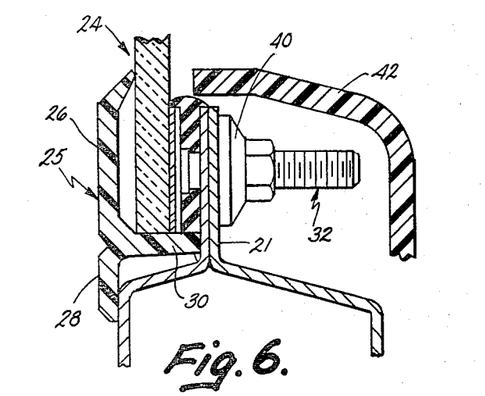
FIG. 6 is a sectional side elevation of the window assembly of FIGS. 4 and 5 secured in a vehicle body and covered by a decorative interior housing.

FIGS. 4-6 illustrate a similar but slightly modified form 24 of the invention as compared to that shown in FIGS. 1-3. In this case, window pane 12 is fastened to a modified decorative trim or frame 25 which is generally T-shaped and includes a flange 26 directed inwardly toward the assembly, flange 28 directed outwardly away from the assembly, and a securing flange 30 extending generally at right angles to flanges 26, 28. Flange 26 is spaced from front surface 12a and extends inwardly from the peripheral edge 12a of window pane 12 a specified distance ending in a tapered, rearwardly inclined flange 26a designed to engage front surface 12b of pane 12 at that specified distance from the peripheral edge 12a. The corner of pane 12, between front surface 12b and peripheral edge surface 12b, engages the junction between the beveled surface 26b and flange 30 such that the corner of the pane is securely retained against that junction. Flange 28 is designed to extend over and seal against the vehicle body metal work as shown in FIG. 6 to help exclude water around the assembly when installed on the vehicle.

The entire decorative trim or frame member 25 is preferably formed, in this instance, from an injection molded polycarbonate or similar resinous plastic which is sufficiently rigid and durable to retain its shape and integrity in the environmental conditions to which vehicles are subjected. Trim member 25 is bonded to the peripheral edge of surface 12a of the window pane using a suitable adhesive such as epoxy, polyurethane or silicone, while flange 30 extends beyond the rear surface 12c of the window pane and forms a stop or abutment which engages the pinch-weld flange 21 of the vehicle body and limits the insertion of the assembly.

On the opposite or rear surface 12c of window pane 12 from flange 26 of the trim member or frame 25 is fastened a metal stud 32 including an integral metal base 34, which may be rectangular as shown, circular, or another shape, secured by welding or the like to a projecting, threaded shaft or fastener 36 best seen in FIGS. 4–6. Studs 32, of which there may be one or more in any assembly, are preferably formed from ferromagnetic metal and fastened immediately adjacent the peripheral edge surface 12a on the rear surface 12c of pane 12 by means of a suitable metal-to-glass adhesive or bonding agent of which several are commercially available.

A preferred adhesive system found suitable for attachment of stud 32 directly to glass, and especially tempered glass in the present invention, is that marketed under the trademark Tenabond by Illinois Tool Works, Inc. of Elgin, Ill. Such system is believed to include an epoxy adhesive layer 38, as shown in FIGS. 4–6, typically applied in tape form to base 34 of stud 32. Base 34 of stud 32 and adhesive layer 38 are pressed against rear surface 12c of pane 12 and heated rapidly using an induction heating apparatus of the type shown in any one of U.S. Pat. Nos. 3,816,690, 4,032,740, 4,163,884 or 4,167,259 which activates the adhesive and causes the stud to be rigidly and securely bonded by what is believed to be a mechanical bond directly to the glass surface. Such induction heated adhesives more securely bond metal to glass than do cold, unheated adhesives. Moreover, the induction heating system provides localized heat which is sufficiently intense to properly activate the adhesive without affecting the temper of the glass to which the stud is being applied. Accordingly, the strength and integrity of the glass to which the stud is bonded is not effected by the heating and the resultant metal-glass assembly is stronger and more durable than with other adhesives.

Tests performed on an 8-32 threaded stud having a ½ square inch base area of the type shown herein and bonded directly to a sheet of tempered glass with the Tenabond adhesive system, specifically adhesive product No. TP-8051, have shown that such a bonded stud can remain strongly and securely attached to the glass even after exposure to the environmental conditions to which an automobile or other vehicle is typically exposed. In the above testing, the bonded stud was subjected to 20 cycles of alternating hot and cold temperatures, specifically two hours at −40° F. followed by five hours at 190° F. The bonded stud exhibited a shear strength of 450 p.s.i. (although it did let loose very slightly) and a tensile strength of 1120 p.s.i. after such cycling. When subjected to seven days exposure to 95% relative humidity at 100° F. followed by seven days exposure to 100% relative humidity at 0° F., the bonded stud exhibited a shear strength of 560 p.s.i. without loosening and a tensile strength of 1140 p.s.i. When exposed to ultraviolet light (simulated sunlight) for seven days, the bonded stud exhibited a shear strength of 740 p.s.i. (although it did let loose very slightly). The tensile strength after this exposure could not be accurately measured because the glass shattered when tensile testing was attempted. When soaked in 100° F. water for two hours, the bonded stud exhibited a shear strength of greater than 400 p.s.i. and a tensile strength between 1200 and 1280 p.s.i. Several different bonded studs were tested as described above, and the above values are considered typical of all of the samples tested. Therefore, such environmental testing indicates that the Tenabond bonded studs maintain a bond strength greater than that required for retention in a vehicle and are fully capable of being properly retained in high and low temperatures, high humidity conditions, and after exposure to ultraviolet light (simulated sunlight).

Other suitable adhesives for metal-to-glass bonds useful in the present invention include anerobic polyacrylate cement such as that disclosed in U.S. Pat. No. 3,885,072, vinyl acetate/phenol formaldehyde containing adhesive such as that disclosed in U.S. Pat. No. 2,502,970, or epoxy containing cement such as that disclosed in Canadian Pat. No. 702,578. The disclosures of the above-identified patents are hereby incorporated by reference herein.

After assembly of the stud 32 at appropriate locations on the glass using one of the adhesive systems mentioned above, the assembly may be completed by applying a bead or strip 18 of butyl sealant adjacent the peripheral edge surface 12a along the rear surface 12c of the window pane as shown in FIG. 5. Sealant 18 may be covered with a wax paper strip 19 to prevent its contamination during shipment of the assembly to a manufacturing location. Thereafter, strip 19 may be removed from butyl sealant 18 and the assembly applied by inserting the fasteners or studs 32 through approximately located apertures 20 in the pinchweld flange 21 and applying retaining nuts 40 over the studs such that the assembly is drawn tightly against the flange 21 with the end of decorative trim flange 30 abutting against the exerior of the flange 21. This procedure compresses butyl sealant 18 between the rear surface of the window pane 12 and around stud 32 to form an effective seal against the entry of water and other contaminants to the interior of the vehicle as shown in FIG. 6.

As will be understood from FIG. 6, the fastening area including butyl sealant 18 is concealed when the assembly is viewed from the exterior of the vehicle and window assembly because flange 26 of trim member 25 covers the attachment area of the stud 32 to the window glass 12. If desired, and in most situations, a decorative plastic or other cover 42 may be applied and secured over the fastening area around the interior of the pinchweld flange to conceal the fastening of the window assembly in place as shown in FIG. 6.

Figure 7:
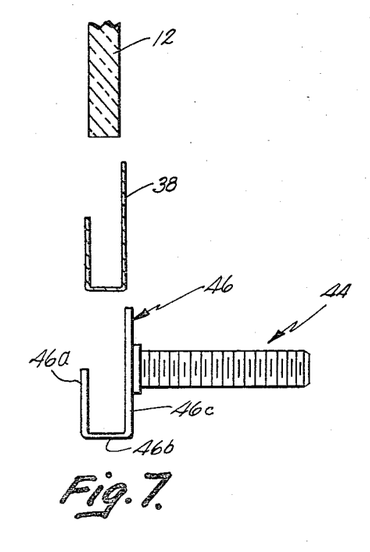
FIG. 7 is a fragmentary, exploded sectional side elevation of a modified form of an attaching stud for the assembly of the present invention.

With reference to FIG. 7, alternative arrangements may be employed to secure attaching fasteners or studs directly to the window glass. In FIG. 7, one alternative includes an attachment stud 44 having a J-shaped attaching base 46 extending around peripheral edge 12a of the window glass. The layer 38' of adhesive suitable for bonding the metallic stud 44 and its base 46 to the window glass 12 is applied between the interior surfaces of base 46 including front flange 46a, peripheral edge flange or side 46b, and rear flange or surface 46c. Stud 44 is heated for activation of the adhesive as described above in the Tenabond system. Securement of flanges 46a and 46b, which are not present in stud 32 described above, makes stronger the overall assembly to which the stud 44 is attached. As an alternative, it would be possible to merely place studs, such as those shown at 44, around the peripheral edge of the glass 12 and secure them in place with a suitable decorative trim or frame, or perhaps such a frame in combination with a bead of butyl sealant 18, to prevent them from shifting along the peripheral edge surface of the glass. In such case, the front flange 46a would hold the stud to the glass and allow the entire assembly to be retained to a pinch-weld flange 21 such as that shown in FIG. 6.

Other modified forms of attachment fasteners could be used besides those shown in FIGS. 1-7. Thus, a metallic, plastic or other channel member may be fitted along an entire edge of a window pane with studs projecting at spaced locations therefrom toward the vehicle. Alternately, base members such as those shown at 46 in FIG. 7 could be connected by appropriate metallic or other webbing so that the location of the attaching studs could be appropriately maintained.

Figure 8:
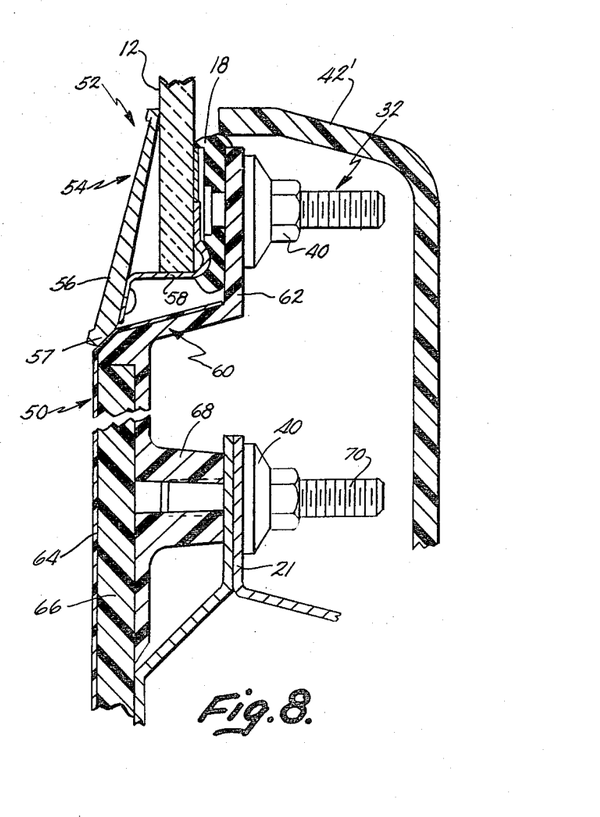
FIG. 8 is a fragmentary, sectional side elevation of another form of the window assembly of the present invention.

Although the window assembly of the present invention is typically applied directly to a metallic pinch-weld flange of a vehicle body, it may also be secured to an intermediate decorative panel such as that shown at 50 in FIG. 8. In this assembly, wherein like numerals indicate like parts to those described above, window assembly embodiment 52 includes modified decorative trim or frame member 54 including a molded, polycarbonate resinous plastic front flange 56 and a series of metal tabs or flanges 58 riveted or swaged over plastic rivets to the rear surface of front flange 56. Flange 56 is generally spaced from the front surface of glass 12 but is inclined to and engages the glass at its inner edge. Metal retaining flanges 58 are bent upwardly to enclose the peripheral edge of the glass 12 such that flanges 58 engage the peripheral edge surface as well as the rear surface of the glass.

Studs 32, which are bonded or adhered directly to a surface of glass 12 as described above, and concealed from view when installed by flange 56, are inserted through aligned apertures in an extending, recessed flange 62 of a molded intermediate panel 60 forming the major portion of the decorative intermediate panel 50 mentioned above. Panel 60 is preferably molded from a plastic material such as polycarbonate or similar resinous plastic and is covered with a layer of decorative vinyl 64 having a backing 66 of urethane foam or the like. The decorative panel assembly forms a spacer between the window assembly 52 and the pinch-weld flange 21 surrounding the window assembly as shown in FIG. 8. Panel 60 also includes a series of spaced, rearwardly extending projections 68 in which are secured during the molding process rectilinear, threaded studs 70 which extend from the projection 68 and are designed to extend through apertures in the pinch-weld flange 21 and to be secured by nuts 40 in a manner similar to the securement of stud 32 through flange 62. In this embodiment, the foam 64 engages the vehicle body to form a seal from the exterior. Butyl sealant 18, behind window assembly 52, and the engagement of beveled surface 57 of front flange 56 of decorative trim or frame 54 with a vinyl covered surface of the intermediate panel assembly 50, together form another seal against water, dirt, and other contaminants. A decorative overlay or panel 42' may be used to cover the fasteners on the interior of the vehicle.

As mentioned above, numerous varities of decorative trim or frame members can be used in the present invention. Several embodiments of those are shown in FIGS. 9-15 wherein like numerals indicate like parts to those described above. Although not shown in FIGS. 9-15, each of the window assembly embodiments shown therein includes attaching studs or fasteners, such as those shown in FIGS. 4-7, which retain the assembly to the pinch-weld flange 21 which is shown in the figures. Such studs may be attached with appropriate adhesive systems or secured around the peripheral edge of the glass as described above.

Figure 9:
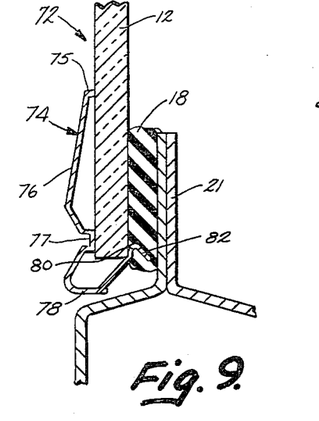
FIG. 9 is a fragmentary, sectional side elevation of another form of the window assembly including a decorative, metallic snap-on trim assembly.

In FIG. 9, window assembly embodiment 72 includes a stamped metallic trim frame 74 including a front flange 76 which is spaced outwardly from the front surface of glass 12 but engages that front surface via inwardly directed sections 75, 77. Front flange 76 extends continuously into a series of spaced retaining tabs 78 which are designed to be snapped over the peripheral edge surface of the glass. The outer ends of the retaining tabs 78 include glass engaging areas 80 which engage both the peripheral edge surface and the rear surface of the glass, as well as a camming surface 82 which is designed to engage the corner between the front and peripheral edge surfaces of the glass when the trim is being applied to force the retaining tab 78 outwardly and allow it to be snapped into position. Retaining tabs 78 thus prevent the trim from sliding toward the center of the glass or from being pulled outwardly away from the front of the glass. Butyl sealant 18 compresses around the areas 80, 82 of the retaining tabs when the assembly is fastened in place as shown in FIG. 9.

Figure 10:
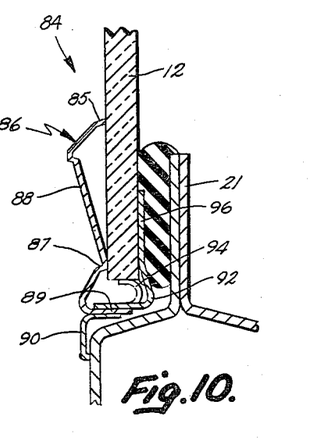
FIG. 10 is a sectional side elevation of yet another form of the window assembly including another form of metallic trim assembly.

In FIG. 10, embodiment 84 of the window assembly also includes a stamped metallic trim or frame 86 having a front flange 88 of different ornamental design but also including areas 85, 87 which space that front flange from the front surface of the glass 12. Spot welded to the outside of a flange portion 89 of frame 86 paralleling the peripheral edge surface is an outwardly extending flange 90 which engages the vehicle body to finish off and seal the assembly around the vehicle body. Also spot welded to the inside surface of flange 89 are a series of retaining tabs 92 which include peripheral edge engaging, curved flanges 94 and rear glass engaging flanges 96. Both of the trim members 74, 86 shown in FIGS. 9 and 10 are formed from resilient metallic materials enabling retaining flanges 78, 92 to bend and snap back into position to hold the trim frame in place.

Figure 11:
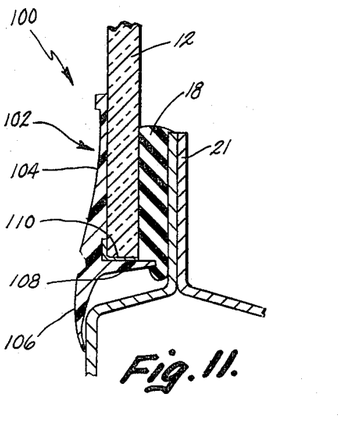
FIG. 11 is a sectional side elevation of another form of the present invention including a molded plastic trim member bonded to the window pane.
Figure 12:
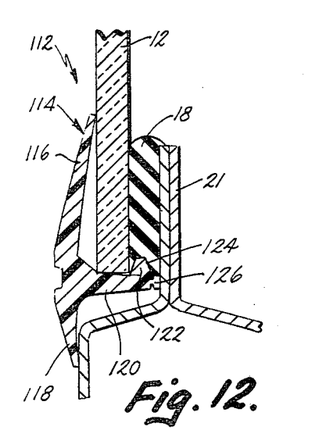
FIG. 12 is a sectional side elevation of another form of the assembly including a snap-on plastic trim assembly.
Figure 14:
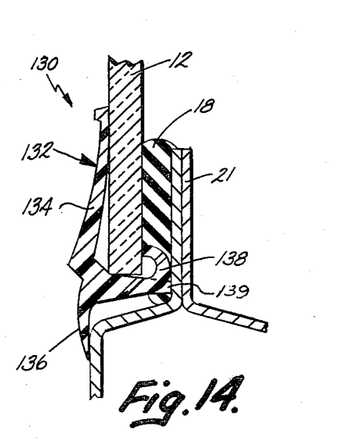
FIG. 14 is a sectional side elevation of a window assembly like that in FIGS. 1-3 including a molded plastic trim member having arcuately formed retaining tab thereon.

As shown in FIGS. 11, 12 and 14, premolded decorative trim or frame members 102, 114 and 132 can also be used and secured to and around the peripheral edge of window pane 12 in various ways. In FIG. 11, embodiment 100 of the window assembly includes a preformed, polycarbonate bezel or frame member 102 including a front flange 104 and an outwardly extending flange 106 designed to engage the vehicle body as a sealing member. Inwardly extending flange 108 and a portion of flange 104 are chemically bonded to the front and peripheral edge surfaces of the window glass 12 by means of a suitable epoxy, polyurethane or silicone adhesive. In the case of embodiment 100, front flange 104 contacts the front surface of the window from the peripheral edge surface outwardly to its free end.

In FIG. 12, a slightly modified molded trim frame or bezel 114 is shown in window assembly 112. Trim bezel or frame 114 includes a front flange 116 which contacts the front surface of window glass 12 only at its free edge, and an outwardly extending flange 118 which engages the vehicle body for sealing purposes. An inwardly extending retaining flange 120 includes spaced ridges 122 which extend substantially parallel to the back surface of glass 12 and include sloped or beveled camming surfaces 124 designed to engage the corner between the front surface and peripheral edge surface of the window glass to pivot the resilient flange 120 outwardly when the trim frame or bezel 114 is snapped in place around the window glass. Flange 120 also includes a series of protruding stop members 126 which space the trim frame or bezel 114, and thus the entire assembly 112, at the proper distance from the exterior surface of the pinch-weld flange 21.

In FIG. 14, window assembly embodiment 130 includes a decorative trim frame or bezel 132 having front flange 134 similar to those shown in embodiments 100 and 112 and an outwardly extending flange 136 which engages the vehicle body for sealing purposes. Frame 132 is retained around the peripheral edge of the window 12 by means of a series of spaced, rolled or arcuately curved retaining tabs 138 similar to tabs 22 in assembly 10 which are heat formed such that their free end edges contact and are parallel to the rear surface of glass 12 as shown in FIG. 14. Between the rolled or arcuately formed retaining tabs 138, the remainder of the inwardly extending flange of the trim frame 132 forms a series of stop members 139 functioning similarly to the flange 30 in FIGS. 4–6 and projecting members 126 in FIG. 12 to space the window assembly properly from the pinch-weld flange 21.

Figure 13:
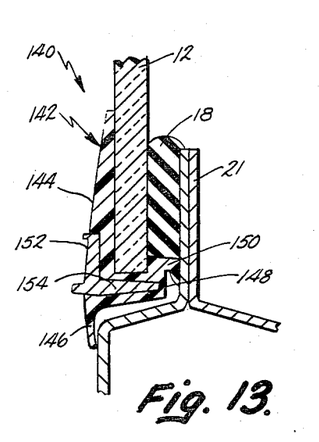
FIG. 13 is a sectional side elevation of a window assembly including a molded trim member which is injection molded around the window pane.

In FIG. 13, window assembly embodiment 140 includes a decorative trim frame or bezel 142 molded in place around the front, back and peripheral edge surfaces of the window glass 12 from polyvinyl chloride in an injection molding apparatus. The trim frame includes a front flange 144, an outwardly extending vehicle body engaging flange 146, a rear glass surface engaging flange 148, and a spacer or stop member 150 for positioning the assembly against the pinch-weld flange 21. Also, an optional, metallic insert 152 may be molded in place in trim member 142 for decorative purposes. Insert 152 includes a flange 154 extending generally parallel to the peripheral edge surface for retention of the insert in the molded trim member.

Figure 15:
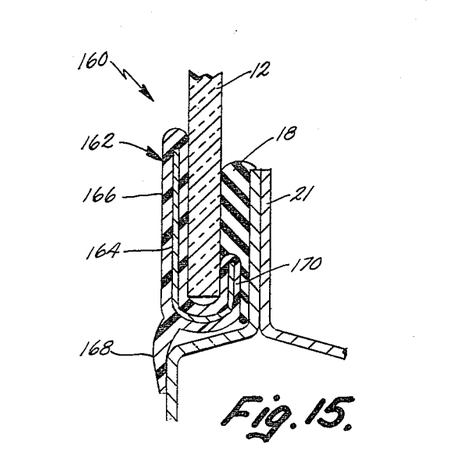
FIG. 15 is yet another form of the window assembly including the combination metal-plastic trim member having bendable retaining tabs holding that member in place on the window pane.

In FIG. 15, yet another embodiment 160 of the window assembly includes a combination metal-resilient plastic trim member 162 bent around the peripheral edge of window glass 12. In this embodiment, the trim member has a bendable metallic core 164 around which is molded a sheath or covering of simulated rubber or other resilient, flexible resinous plastic material. Trim member 162, like the others described above, includes a front flange 166, a vehicle body engaging flange 168, and rear glass surface engaging flanges or tabs 170 at spaced locations. Frame member 162, however, need not engage the peripheral edge surface of window pane 12 for retention purposes.

Accordingly, it will be understood that in each of the vehicle window assembly embodiments described herein, the fasteners are concealed from view from the front or exterior side of the installed window assembly principally because the attachment area of the studs or fasteners to the glass is hidden behind the front flange of the trim or decorative member extending around the peripheral edge of the glass surface. The decorative trim or frame members provide a finished appearance for the assembly without further assembly or finishing procedures being necessary in the manufacturing process of the automobile. Moreover, sealing is accomplished both with flanges on the decorative trim or frame as well as through the use of the butyl sealant bead at the rear of the assembly. Finally, integrity and strength for the assembly and its fastening to the vehicle body is obtained through strong, rigid attachment of the securing studs using an appropriate metal-to-glass adhesive or other adhesives depending on the materials used for the fasteners and/or window pane.

While several forms of the invention have been shown and described, other forms will now be apparent to those skilled in the art. Therefore, it will be understood that embodiments shown in the drawings and described above are merely for illustrative purposes and are not intended to limit the scope of the invention which is defined by the claims which follow.

The embodiments of the invention in which an exclusive property or privilege is claimed are defined as follows:

1. A window assembly for vehicles adapted for installation as a unit from the exterior of a vehicle to close an opening in the vehicle body comprising:

a window pane having front, back and peripheral edge surfaces;

a decorative frame covering the periphery of said window pane, said frame including a flange extending a predetermined distance over said front surface of said window pane to cover an area adjacent said peripheral edge surface, and securing means for securing said frame to said pane; and attaching means rigidly secured to at least one surface of said window pane for fastening said window assembly to an adjacent support, said attaching means being concealed from view when said assembly is viewed from the direction of said front surface.

2. The window assembly of claim 1 wherein said attaching means are secured to said pane behind said frame and within the projection of said area adjacent said peripheral edge.

3. The window assembly of claim 1 wherein said securing means include a peripheral edge surface engaging portion on said frame; said flange engaging said front surface at least at one location spaced inwardly of said peripheral edge surface.

4. The window assembly of claim 3 wherein said securing means include a frame portion engaging said back surface of said window pane such that said frame is clamped over said peripheral edge surface.

5. The window assembly of claim 4 wherein said frame is formed from resilient material such that said peripheral edge surface and back surface engaging portions are outwardly bendable but snap back into position around said peripheral edge surfaces; said back surface frame engaging portion including camming means for urging said peripheral edge surface and back surface engaging portions of said frame outwardly around said peripheral edge surface when engaged with said peripheral edge surface.

6. The window assembly of claim 4 wherein said back surface engaging frame portion includes at least one arcuately formed flange having an end surface engaging said back surface of said window pane.

7. The window assembly of claim 3 or 4 wherein said frame includes spacing means for engaging a portion of a vehicle against which said assembly is adapted to be fitted and spacing said assembly a predetermined distance away from that vehicle portion.

8. The window assembly of claim 3 wherein at least said peripheral edge surface engaging portion is secured to said edge surface with an adhesive material.

9. The window assembly of claim 1 wherein said decorative frame is molded from a resinous material around said peripheral edge surface such that the molded frame engages at least portions of said front, back and peripheral edge surfaces.

10. The window assembly of claim 1 wherein said decorative frame includes a bendable metallic core enveloped in a resilient, resinuous covering material; said frame including a bent portion engaging said back surface of said window pane such that said frame is clamped over said peripheral edge surface.

11. The window assembly of claim 1 including an intermediate support panel extending along and secured to at least a portion of said assembly, said intermediate support panel including a flange for engaging said attaching means to secure said panel to said assembly, and fastening means for securing said combined assembly and panel to a vehicle.

12. The window assembly of claim 1 including a compressible sealant material applied to at least portions of said back surface of said window pane adjacent said peripheral edge surface.

13. The window assembly of claim 12 wherein said compressible sealant material is a bead of butyl sealer extending over and engaging portions of said attaching means and decorative frame.

14. A window assembly for vehicles adapted for installation as a unit from the exterior of a vehicle to close an opening in the vehicle body comprising:
a window pane having front, back and peripheral edge surfaces;
a decorative frame covering the periphery of said window pane, said frame including a flange extending a predetermined distance over said front surface of said window pane to cover an area adjacent said peripheral edge surface, and securing means for securing said frame to said pane; and
attaching means secured to at least one surface of said window pane for fastening said window assembly to an adjacent support, said attaching means being concealed from view when said assembly is viewed from the direction of said front surface;
said attaching means being secured to said pane behind said frame and within the projection of said area adjacent said peripheral edge;
said attaching means including rigid means spaced along said peripheral edge surface and projecting away from said back surface of said window pane for securing said assembly to a vehicle.

15. A window assembly for vehicles adapted for installation as a unit from the exterior of a vehicle to close an opening in the vehicle body comprising:
a window pane having front, back and peripheral edge surfaces;
a decorative frame covering the periphery of said window pane, said frame including a flange extending a predetermined distance over said front surface of said window pane to cover an area adjacent said peripheral edge surface, and securing means for securing said frame to said pane; and
attaching means secured to at least one surface of said window pane for fastening said window assembly to an adjacent support, said attaching means being concealed from view when said assembly is viewed from the direction of said front surface;
said attaching means being secured to said pane behind said frame and within the projection of said area adjacent said peripheral edge;
said attaching means including a plurality of rigid studs spaced along said peripheral edge surface and secured directly to at least said back surface of said window pane, said studs projecting outwardly of said back surface of said pane.

16. The window assembly of claims 14 or 15 including bonding means intermediate said attaching means and window pane for rigidly securing said attaching means directly to said window pane.

17. The window assembly of claim 16 wherein said attaching means are formed from metal, said window pane being formed from glass; said bonding means including an adhesive sufficient to adhere metal to glass.

18. The window assembly of claim 16 wherein said attaching means are formed from metal, said window pane being formed from glass; said bonding means including a heat activatable epoxy cement adapted for activation by induction heating.

19. A window assembly for vehicles adapted for installation as a unit from the exterior of a vehicle to close an opening in the vehicle body comprising:
a window pane having front, back and peripheral edge surfaces;
a decorative frame covering the periphery of said window pane, said frame including a flange extending a predetermined distance over said front surface of said window pane to cover an area adjacent said peripheral edge surface, and securing means for securing said frame to said pane; and
attaching means secured to at least one surface of said window pane for fastening said window assembly to an adjacent support, said attaching means being concealed from view when said assembly is viewed from the direction of said front surface;
said attaching means being secured to said pane behind said frame and within the projection of said area adjacent said peripheral edge;
said attaching means including a plurality of rigid studs spaced along said peripheral edge surface, each stud including a base extending from said front surface around said peripheral edge surface to said back surface, said studs projecting outwardly of said back surface of said pane.

20. A window assembly for vehicles adapted for installation as a unit from the exterior of a vehicle to close an opening in the vehicle body comprising:
a window pane having front, back and peripheral edge surfaces;
a decorative frame covering the periphery of said window pane, said frame including a flange extending a predetermined distance over said front surface of said window pane to cover an area adjacent said peripheral edge surface, and securing means for securing said frame to said pane; and
attaching means secured to at least one surface of said window pane for fastening said window assembly to an adjacent support, said attaching means being concealed from view when said assembly is viewed from the direction of said front surface;
said frame including spacing means for engaging a portion of a vehicle against which said assembly is adapted to be fitted and spacing said assembly a predetermined distance away from that vehicle portion;
said window assembly being in combination with a vehicle body, said vehicle body including means defining a window opening for receiving said window assembly; said spacing means engaging a portion of said vehicle body and positioning said window assembly; compressible sealing material extending between said window assembly and said vehicle body; and fastening means engaging said attaching means for retaining said window assembly on said vehicle body.

21. A window assembly for vehicles adapted for installation as a unit from the exterior of a vehicle to close an opening in the vehicle body comprising:
a window pane having front, back and peripheral edge surfaces;
a decorative frame covering the periphery of said window pane, said frame including a flange extending a predetermined distance over said front surface of said window pane to cover an area adjacent said peripheral edge surface, and securing means for securing said frame to said pane; and
attaching means secured to at least one surface of said window pane for fastening said window assembly to an adjacent support, said attaching means being concealed from view when said assembly is viewed from the direction of said front surface;
said window assembly being in combination with a vehicle body, said vehicle body including means defining a window opening for receiving said window assembly; sealing means between said window assembly and vehicle body for preventing entry of any water or contaminants therebetween; and fastening means engaging said attaching means for retaining said window assembly on said vehicle body.

22. A window assembly for vehicles adapted for installation as a unit from the exterior of a vehicle to close an opening in the vehicle body comprising:
a window pane having front, back and peripheral edge surfaces;
decorative trim means secured to said pane for covering the periphery of said window pane, said trim means including a trim portion extending a predetermined distance over said front surface of said window pane to cover an area adjacent said peripheral edge surface;
attaching means rigidly secured to at least one surface of said window pane for fastening said window assembly to an adjacent support, said attaching means being concealed from view by said trim means when said assembly is viewed from the direction of said front surface; and
bonding means for bonding said attaching means in said rigid securement directly to said surface of said window pane.

23. A window assembly for vehicles adapted for installation as a unit from the exterior of a vehicle to close an opening in the vehicle body comprising:
a window pane having front, back and peripheral edge surfaces;
decorative trim means secured to said pane for covering the periphery of said window pane, said trim means including a trim portion extending a predetermined distance over said front surface of said window pane to cover an area adjacent said peripheral edge surface;
attaching means secured to at least one surface of said window pane for fastening said window assembly to an adjacent support, said attaching means being concealed from view by said trim means when said assembly is viewed from the direction of said front surface; and
bonding means for bonding said attaching means directly to said surface of said window pane;
said attaching means including a plurality of rigid, metallic studs located at spaced positions and projecting away from the back surface of said window pane.

24. A window assembly for vehicles adapted for installation as a unit from the exterior of a vehicle to close an opening in the vehicle body comprising:
a window pane having front, back and peripheral edge surfaces;
decorative trim means secured to said pane for covering the periphery of said window pane, said trim means including a trim portion extending a predetermined distance over said front surface of said window pane to cover an area adjacent said peripheral edge surface;
attaching means secured to at least one surface of said window pane for fastening said window assembly to an adjacent support, said attaching means being concealed from view by said trim means when said assembly is viewed from the direction of said front surface; and
bonding means for bonding said attaching means directly to said surface of said window pane;
a compressible sealant material applied to at least portions of said back surface of said window pane adjacent said peripheral edge surfaces.

25. A window assembly for vehicles adapted for installation as a unit from the exterior of a vehicle to close an opening in the vehicle body comprising:
a window pane having front, back and peripheral edge surfaces;
decorative trim means secured to said pane for covering the periphery of said window pane, said trim means including a trim portion extending a predetermined distance over said front surface of said window pane to cover an area adjacent said peripheral edge surface;
attaching means secured to at least one surface of said window pane for fastening said window assembly to an adjacent support, said attaching means being concealed from view by said trim means when said assembly is viewed from the direction of said front surface; and
bonding means for bonding said attaching means directly to said surface of said window pane;
said attaching means being formed from metal, said window pane being formed from glass; said bonding means including an adhesive sufficient to adhere metal to glass.

26. The window assembly of claim 25 wherein said adhesive is chosen from the group including anerobic polyacrylate cement, vinyl acetate/phenol formaldehyde, and epoxy cement.

27. The window assembly of claim 25 wherein said adhesive is a heat activatable epoxy cement adapted for activation by induction heating.

28. A window assembly for vehicles adapted for installation as a unit from the exterior of a vehicle to close an opening in the vehicle body comprising:
a window pane having front, back and peripheral edge surfaces;
decorative trim means secured to said pane for covering the periphery of said window pane, said trim means including a trim portion extending a predetermined distance over said front surface of said window pane to cover an area adjacent said peripheral edge surface;

attaching means secured to at least one surface of said window pane for fastening said window assembly to an adjacent support, said attaching means being concealed from view by said trim means when said assembly is viewed from the directon of said front surface; and bonding means for bonding said attaching means directly to said surface of said window pane;

said window assembly being in combination with a vehicle body, said vehicle body including means defining a window opening for receiving said window assembly; sealing means between said window assembly and vehicle body for preventing entry of any water or contaminants therebetween; and fastening means engaging said attaching means for retaining said window assembly on said vehicle body.

29. A window assembly for vehicles adapted for installation as a unit from the exterior of a vehicle to close an opening in the vehicle body comprising:

a window pane having front, back and peripheral edge surfaces;

a decorative frame covering the periphery of said window pane, said frame including a flange extending a predetermined distance over said front surface surface of said window pane to cover an area adjacent said peripheral edge surface, and securing means for securing said frame to said pane; and attaching means secured to at least one surface of said window pane for fastening said window assembly to an adjacent support, said attaching means being concealed from view when said assembly is viewed from the direction of said front surface; and bonding means intermediate said attaching means and window pane for rigidly securing said attaching means directly to said window pane.

30. A window assembly for vehicles adapted for installation as a unit from the exterior of a vehicle to close an opening in the vehicle body comprising:

a window pane having front, back and peripheral edge surfaces;

a decorative frame covering the periphery of said window pane, said frame including a flange extending a predetermined distance over said front surface of said window pane to cover an area adjacent said peripheral edge surface, and securing means for securing said frame to said pane; and attaching means secured to at least one surface of said window pane for fastening said window assembly to an adjacent support, said attaching means being concealed from view when said assembly is viewed from the direction of said front surface;

said attaching means being secured to said pane behind said frame and within the projection of said area adjacent said peripheral edge; and bonding means intermediate said attaching means and window pane for rigidly securing said attaching means directly to said window pane.

31. The window assembly of claims 29 and 30 wherein said attaching means are formed from metal, said window pane being formed from glass; said bonding means including an adhesive sufficient to adhere metal to glass.

32. The window assembly of claim 29 or 30 wherein said attaching means are formed from metal, said window pane being formed from glass; said bonding means including a heat activatable epoxy cement adapted for activation by induction heating.

33. A window assembly for vehicles adapted for installation as a unit fro the exterior of a vehicle to close an opening in the vehicle body comprising:

a window pane having front, back and peripheral edge surfaces;

a decorative frame covering the periphery of said window pane, said frame including a flange extending a predetermined distance over said front surface of said window pane to cover an area adjacent said peripheral edge surface, and securing means for securing said frame to said pane; and attaching means secured to at least one surface of said window pane for fastening said window assembly to an adjacent support, said attaching means being concealed from view when said assembly is viewed from the direction of said front surface; and said frame including spacing means for engaging a portion of a vehicle against which said assembly is adapted to be fitted and spacing said assembly a predetermined distance away from that vehicle portion.

34. A window assembly for vehicles adapted for installation as a unit from the exterior of a vehicle to close an opening in the vehicle body comprising:

a window pane having front, back and peripheral edge surfaces;

a decorative frame covering the periphery of said window pane, said frame including a flange extending a predetermined distance over said front surface of said window pane to cover an area adjacent said peripheral edge surface, and securing means for securing said frame to said pane; and attaching means secured to at least one surface of said window pane for fastening said window assembly to an adjacent support, said attaching means being concealed from view when said assembly is viewed from the direction of said front surface;

said securing means including a peripheral edge surface engaging portion on said frame; said flange engaging said front surface at least at one location spaced inwardly of said peripheral edge surface;

said securing means also including a frame portion engaging said back surface of said window pane such that said frame is clamped over said peripheral edge surface;

said frame including spacing means for engaging a portion of a vehicle against which said assembly is adapted to be fitted and spacing said assembly a predetermined distance away from that vehicle portion; and said window assembly being in combination with a vehicle body, said vehicle body including means defining a window openin for receiving said window assembly; said spacing means engaging a portion of said vehicle body and positioning said window assembly; compressible sealing material extending between said window assembly and said vehicle body; and fastening means engaging said attaching means for retaining said window assembly on said vehicle body.

35. A window assembly for vehicles adapted for installation as a unit from the exterior of a vehicle to close an opening in the vehicle body comprising:

a window pane having front, back and peripheral edge surfaces;

a decorative frame covering the periphery of said window pane, said frame including a flange extending a predetermined distance over said front surface of said window pane to cover an area adjacent said peripheral edge surface, and securing means for securing said frame to said pane; and attaching means secured to at least one surface of said window pane for fastening said window assembly to an adjacent support, said attaching means beng concealed from view when said assembly is viewed from the direction of said front surface;

said securing means including a peripheral edge surface engaging portion on said frame; said flange engaging said front surface at least at one location spaced inwardly of said peripheral edge surface;

said frame including spacing means for engaging a portion of a vehicle against which said assembly is adapted to be fitted and spacing said assembly a predetermined distance away from that vehicle portion; and said window assembly being in combination with a vehicle body, said vehicle body including means defining a window opening for receiving said window assembly; said spacing means engaging a portion of said vehicle body and positioning said window assembly; compressible sealing material extending between said window assembly and said vehicle body; and fastening means engaging said attaching means for retaining said window assembly on said vehicle body.

* * * * *

UNITED STATES PATENT AND TRADEMARK OFFICE
CERTIFICATE OF CORRECTION

PATENT NO. : 4,364,595

DATED : December 21, 1982

INVENTOR(S) : Cleon Morgan, John F. Thomas, Jr. and Raymond A. Meyer

It is certified that error appears in the above-identified patent and that said Letters Patent is hereby corrected as shown below:

Column 6, line 32:

"approximately" should be --appropriately--

Column 16, line 2:

"fro" should be --from--

Column 16, line 53:

"openin" should be --opening--

Column 17, line 6:

"beng" should be --being--

Signed and Sealed this

Twentieth Day of December 1983

[SEAL]

Attest:

GERALD J. MOSSINGHOFF

Attesting Officer     Commissioner of Patents and Trademarks